United States Patent [19]

Lindner et al.

[11] Patent Number: 4,767,821

[45] Date of Patent: * Aug. 30, 1988

[54] POLYMER POWDER COMPOSITIONS CONTAINING TETRAFLUOROETHYLENE POLYMERS

[75] Inventors: Christian Lindner, Cologne; Horst Peters, Leverkusen; Bernd Urbanneck, Monchen-Gladbach, all of Fed. Rep. of Germany

[73] Assignee: Bayer Aktiengesellschaft, Leverkusen-Bayerwerk, Fed. Rep. of Germany

[*] Notice: The portion of the term of this patent subsequent to Apr. 1, 2003 has been disclaimed.

[21] Appl. No.: 888,025

[22] Filed: Jul. 18, 1986

Related U.S. Application Data

[63] Continuation of Ser. No. 735,041, May 17, 1985, abandoned.

[30] Foreign Application Priority Data

May 29, 1984 [DE] Fed. Rep. of Germany ....... 3420002

[51] Int. Cl.$^4$ .................. C08L 51/04; C08L 55/02; C08L 27/18; C08J 3/16
[52] U.S. Cl. ................................. 525/72; 525/117
[58] Field of Search .......................................... 525/72

[56] References Cited

U.S. PATENT DOCUMENTS

| | | | |
|---|---|---|---|
| 3,074,901 | 1/1963 | Lantos | 260/31.8 |
| 4,355,126 | 10/1982 | Haaf et al. | 524/411 |
| 4,579,906 | 4/1986 | Zabrocki et al. | 525/72 |

Primary Examiner—Carman J. Seccuro
Attorney, Agent, or Firm—Connolly and Hutz

[57] ABSTRACT

The invention relates to a process for the preparation of powder form polymer mixtures consisting of a tetrafluoroethylene polymer and an organic thermoplastic polymer, the tetrafluoroethylene polymer being present in the compositions in a particulate, highly disperse form; the powder form polymer mixtures thereby obtained have special and surprising properties when they are processed in a thermoplastic manner to give plastics articles and when they are added to conventional thermoplastics.

5 Claims, No Drawings

POLYMER POWDER COMPOSITIONS CONTAINING TETRAFLUOROETHYLENE POLYMERS

This application is a continuation of application Ser. No. 06/735,041, filed on May 17, 1985, now abandoned.

The invention relates to a process for the preparation of powderform polymer mixtures in the following referred to as powder compositions which contain a highly disperse, particulate tetrafluoroethylene polymer containing 65 to 76% by weight fluorine, which are suitable for processing in a thermoplastic manner or for use as additives in thermoplastic moulding compositions and which are based on an organic thermoplastic polymer, wherein I. a dispersion (A) of an organic thermoplastic polymer having an average particle diameter ($d_{50}$) of 0.05-30 μm and a solids content of 20-60% by weight is mixed with a dispersion (B) of a tetrafluoroethylene polymer having an average particle diameter ($d_{50}$) of 0.05-30 μm and a solids content of 30-70% by weight in such a way that no appreciable agglomeration of the particles takes place, and that the mixed dispersion formed contains 0.01-40% by weight of tetrafluoroethylene polymer and 99.99-60% by weight of organic thermoplastic polymer, II. the mixed dispersion formed in I. is coagulated within a temperature range of 20°-120° C. and at pH values of 7-2 with the formation of a composition of powder particles, in such a way that no appreciable amounts of tetrafluoroethylene polymer particles having a particle size larger than 30 μm are formed during the coagulation, and III. the coagulate formed in II. is dried at temperatures of 50°-150° C.

A preferred embodiment of the process employs aqueous dispersions (A) of organic thermoplastic polymers having a particle size ($d_{50}$ value) of 0.05-5 μm. Especially preferred are mixtures of dispersions wherein 20-80% by weight of small particle size polymer having an average particle size of 0.05-0.15 μm and 20-80% by weight of large particle size polymers having an average particle size of 0.2-0.8 μm (preferably 0.25-0.5 μm) are present.

The tetrafluoroethylene polymer dispersions (B) which are suitable in accordance with the invention preferably contain water as the dispersing medium. They contain, in a dispersed form, particulate tetrafluoroethylene polymer consisting essentially or predominantly of tetrafluoroethylene units which has a fluorine content of 65-67% by weight, preferably 70-76%.

Examples of these polymers are polytetrafluoroethylene, tetrafluoroethylene/hexafluoroethylene copolymers or tetrafluoro-ethylene copolymers containing small amounts of fluorine-free, copolymerisable, ethylenically unsaturated monomers. These polymers are known, (see "Vinyl and Relates (sic) Polymers" by Schildknecht, published by John Wiley & Sons, Inc., New York, 1952, pages 484-494; "Fluorpolymers" by Wall, published by Wiley-Interscience, Division of John Wiley & Sons, Inc., New York, 1972;

The dispersion A which are suitable in accordance with the invention are also known.

In these, particulate polymers are present in a non-crosslinked, partly crosslinked or highly crosslinked form. The dispersing medium used can be water or organic solvents, such as esters, hydrocarbons, halogenated hydrocarbons, alcohols or the like, or mixtures of these media; the preferred medium is water. Dispersions of this type are known and described, for example in European Patent No. 28,344, DE-AS (German Published Specification) No. 2,047,427. They are customary polymer dispersions obtainable by emulsion or dispersion polymerisation or those which are obtainable by dispersing in specific media a prefabricated polymer.

The dispersions A which are suitable in accordance with the invention preferably contain the following polymers:

thermoplastic polymers based on olefinically unsaturated monomers, such as styrene, α-methylstyrene, p-methylstyrene, a halogenostyrene, acrylonitrile, methacrylonitrile, an alkyl acrylate, an alkyl methacrylate, maleic anhydride, an N-substituted maleinimide, vinyl acetate, vinyl chloride, vinylidene chloride or vinylidene fluoride and/or thermoplastic graft polymers of the monomers mentioned above on rubber bases having rubber glass transition temperatures below 0° C., the graft polymers having a rubber content of 8-80% by weight.

The following polymers are particularly suitable in the dispersions A: homopolymers of styrene, methyl methacrylates, vinyl chlorides and copolymers thereof containing at least one monomer from the series acrylonitrile, methacrylonitrile, an N-substituted maleinimide (especially N-phenylmaleinimide or N-cyclohexylmaleinimide), an alkyl methacrylate or an alkyl acrylate, as well as graft polymers, for example, from diene monomer rubbers belonging to the series comprising the polybutandienes, polychloroprenes or styrene/butadiene or acrylinitrile/butadiene copolymer rubbers having gel contents (measured at 20° C.) higher than 30% by weight, alkyl acrylate rubbers composed essentially of alkyl acrylate monomers, EPDM rubbers (of Ethylen, Propylen and small amounts of a non-conjugated diene) or silicone rubbers which have been grafted with monomers such as styrene, α-methylstyrene, acrylonitrile, methyl methacrylate, vinyl chloride or vinyl acetate or mixtures thereof. These graft polymers can be prepared by free-radical emulsion polymerisation and are known to the art.

The invention also relates to the use of the powder compositions according to the invention as an additive in conventional thermoplastic moulding compositions for improving the properties of the latter in use. In this case the powder compositions are preferably employed in an amount such that less than 1% by weight of tetrafluoroethylene polymer (in particular less than 0.8% by weight) is present in the total moulding composition. As a result of adding the powder compositions according to the invention, which contain the tetrafluoroethylene polymer in a particulate, highly disperse form, a very wide range of properties are improved appreciably; thus the additives act as anti-drip agents in the event of moulded articles taking fire. In spite of the presence of the tetrafluoroethylene polymers, however, there is no interference with the surface properties. Furthermore, the mould release behaviour, the impact strength and the dimensional stability under heat are markedly improved. The powder compositions are outstandingly suitable as an additive for thermoplastics belonging to the series comprising ABS, PVC, polycarbonates, polyamides and polyalkylenecarboxylic acid esters, especially ABS, bisphenol A polycarbonate, polycaproamide (Nylon 6), polyhexamethylenediaminoadipimide (Nylon 66), polyethylene terephthalate and polybutylene terephthalate.

WORKING EXAMPLES

Section A

Materials used:

I. Styrene/acrylonitrile copolymer (ratio by weight 66:34) having an average molecular weight of 165,000, prepared by emulsion polymerisation and then isolated in the form of powder.

II. Styrene/acrylonitrile graft polymer containing 50% by weight of styrene-acrylonitrile mixture (in a ratio by weight of 72:28) on 50% by weight of polybutadiene having an average particle diameter ($d_{50}$) of 0.4 μm, prepared by emulsion polymerisation and isolated by coagulation.

III. Dispersion of polytetrafluoroethylene (Hostaflon TF 5032, made by Hoechst AG) having an F content of 70.5% by weight.

IV. $Sb_2O_3$ (Stibiox MS)

V. Decabromodiphenyl ether (DE 79 made by Great Lakes Comp.)

Preparation of a polymer mixture according to the invention

The dispersion III was mixed with the latex II of the graft polymer in a ratio (relative to solid polymers) of 0.1:99.9. After thorough distribution had been achieved, 1.8% by weight, relative to polymer solids, of phenolic antioxidants were added in the form of an aqueous dispersion, and the mixture was added at 85°–95° C. to an aqueous solution of $MgSO_4$ and acetic acid (pH=4–5) and the coagulate was filtered off, washed until virtually free from electrolytes, dehydrated and dried at 100° C. to give a powder. This powder will be designated "FR" in the text which follows.

Preparation and testing of mixtures according to the invention

The ingredients I, II, FR, IV and V were mixed in the quantities indicated in Table 1 (data in parts by weight) on an internal kneader.

TABLE 1

| Test | I | II | FR | IV | V | Additives |
|---|---|---|---|---|---|---|
| Comparison 1 | 60.0 | 40.0 | — | 6.0 | 20.0 | 3.0 pentaerythritol tetrastearate |
| Comparison 2 | 80.0 | 20.0 | — | 6.0 | 18.0 | 0.2 silicone oil |
| | | | | | | 0.5 Sn stabiliser |
| | | | | | | 2.0 diphenyl-2-ethylhexyl phosphate |
| Example 1 | 60.0 | 40.0 | 2.0 | 6.0 | 20.0 | |
| Example 2 | 80.0 | 20.0 | 2.0 | 6.0 | 18.0 | |

The resulting compositions were injection-moulded to give test specimens and subjected to the following tests:

Impact strength as specified in DIN 53,543 [$a_n$]

Notched impact strength as specified in DIN 53,543 [$a_k$]

Dimensional stability under heat as measured by Vicat B [Vicat B]

Fire test as specified by Underwriters Laboratories, Subject 94 [UL 94]

Flammability test as specified in IBM Standard DMH 6-0430-102 [IBM test]

Visual assessment of the surface.

Table 2 shows the test data obtained with the examples and comparison tests:

| | $a_n$ | $a_k$ | Vicat B | IBM test 1.6 mm | IBM test 3.2 mm | Ul 94 1.6 mm | Ul 94 3.2 mm | Surface |
|---|---|---|---|---|---|---|---|---|
| Comparison 1 | 96 | 12 | 90 | 15 DJ | 25 DJ | VO | VO | glossy |
| Comparison 2 | 63 | 6.2 | 91 | 15 DJ | 30 DJ | VO | VO | glossy |
| Example 1 | 96 | 12 | 88 | 20 DJ | 55 DJ | VO | VO | glossy |
| Example 2 | 62 | 6.9 | 90 | 35 DJ | 60 DJ | VO | VO | glossy |

The addition of polytetrafluoroethylene in powder form (comparison tests not in accordance with the invention)

80 parts of resin I
20 parts of graft polymer II
3 parts of pentaerythritol tetrastearate
0.2 part of silicone oil
0.5 parts of Sn stabiliser
6.0 parts of $Sb_2O_3$ (IV)
18.0 parts of DE79 (V)

were mixed in the usual way with the addition of the amounts indicated in Table 3 of polytetrafluoroethylene powder (Hostaflon TF 9202 made by Hoechst). The surface finish was assessed qualitatively and the surface gloss was assessed in accordance with the A-H rating of DE-AS (German Published Specification) No. 2,420,358.

TABLE 3

| | Amount of polytetrafluoroethylene powder added [parts] | Glass level | Surface |
|---|---|---|---|
| Comparison test 3 | — | F | glossy |
| Comparison test 4 | 1 | C | light formation of haze |
| Comparison test 5 | 2 | B-C | considerable formation of haze |

Section B

Polymers and additives employed

I. Aromatic polycarbonate composed of 10% by weight of tetrabromobisphenol A and 90% by weight of bisphenol A having a relative viscosity, determined in $CH_2Cl_2$ at 25° C., of 1.284 (0.5% strength by weight solution).

II. Oligomeric polycarbonate composed of tetrabromobisphenol A and having an average degree of polycondensation of 5.

III. SAN graft polymer containing 50% by weight of styrene/acrylonitrile mixture (in a ratio by weight of 72:28) on 50% of particulate polybutadiene having an average particle size ($d_{50}$) of 0.4 μm, obtained by emulsion polymerisation.

IV. Thermoplastic polymer formed from styrene and acrylonitrile, having an acrylonitrile content of 26% by weight and an average molecular weight of 60,000.

V. Polytetrafluoroethylene "Teflon 702 N" (Dupont) in the form of powder. The polymer has an F content of 73.7% by weight.

VI. Dispersions of tetrafluoroethylene polymer "Teflon 42 N" (Dupont); the dispersed polymer has an F content of 73.7% by weight, or dispersions of tetrafluoroethylene polymer "Hostaflon TF 5032" (made by Hoechst); this dispersed polymer has an F content of 70.5% by weight.

VII. $Sb_2O_3$ ("Stibiox MS").

VIII. Carbon black "Black-Pearls 900" (made by Cabot).

Preparation of the moulding compositions (a) Preparation by direct compounding of all the components:

Compounding on a Banbury internal kneader (made by Pomini-Farrel), model BR (1.2 l) or model OOC (3 l) at 230°–240° C. This parts by weight indicated in the tables are compounded in a direct manner.

(b) Preparation by the process according to the invention:

The dispersion of the tetrafluoroethylene polymer VI was mixed with the emulsion of the SAN graft polymer III and, if appropriate, the emulsions (sic) of the thermoplastic polymer IV, and was stabilised with 1.8% by weight, relative to polymer solids, of phenolic antioxidants. The mixture is coagulated at 85°–95° C. and at pH 4 by means of an aqueous solution of $MgSO_4$ (Epsom salt) and acetic acid, and the coagulate was filtered off and washed until virtually free from electrolytes, then freed from the bulk of the water by centrifuging and then dried at 100° C. to give a powder.

This powder can then be compounded with the further components in the units described in (a).

Composition of the moulding compositions

The composition of the moulding compositions is shown in Table 1 and 2 (data in parts by weight):

TABLE 1

|  | 1 | 2 | 3 | 4 | 5 | 6 |
|---|---|---|---|---|---|---|
| Polycarbonate I | 70 | 72 | 72 | 70 | 70 | 70 |
| Polycarbonate II | 1 | 1 | 1 | 1 | 1 | 1 |
| Graft polymer III | 11.2 | — | — | 14 | — | — |
| Polymer IV | 16.8 | 16.8 | 16.8 | 14 | 14 | 14 |
| $Sb_2O_3$ | 2 | 2 | 2 | 2 | 2 | 2 |
| Carbon black | — | — | — | 1 | 1 | 1 |
| Mixture composed of 97.5% by weight of III and 2.5% by weight of Teflon 42 N, prepared in accordance with the invention (as in b), | — | 11.2 | — | — | 14 | — |
| Mixture composed of 97.5% by weight of III and 2.5% by weight of Hostaflon TF 5032, prepared in accordance with the invention (as in b) | — | — | 11.2 | — | — | 14 |

The components were compounded in the unit shown under (a).

TABLE 2

|  | 7 | 8 | 9 | 10 | 11 |
|---|---|---|---|---|---|
| Polycarbonate I | 70 | 70 | 70 | 70 | 70 |
| $Sb_2O_3$ | 2 | 2 | 2 | 2 | 2 |
| Teflon 702 N powder V | — | 0.25 | — | — | — |
| $ABS^{(1)}$ | 28 | 28 | — | 28 | 28 |
| Mixture composed of 99% of $ABS^{(1)(2)}$ and 1% of Hostaflon TF 5032, prepared in accordance with the invention (as in b) and powder$^{(3)}$, obtained from the dispersion of Hostaflon TF 5032 | — | — | 28 | 0.25 | 0.1 |

$^{(1)}$ABS consists of 60 parts by weight of resin IV and 40 parts by weight of graft polymer III; the components were prepared by emulsion polymerisation, the latices were mixed and precipitated at pH 4–5 to give a powder, which was worked up.
$^{(2)}$The latex mixture composed of III and IV is mixed with a dispersion of "Hostaflon TF 5032", and the mixture is then worked up at pH 4–5 to give a powder.
$^{(3)}$The dispersion of "Hostaflon TF 5032" is coagulated, the coagulate is filtered off and the powder is dried at 70$o#C.

Properties of the moulding compositions

The moulding compositions 1–11 are injection-moulded at 260° C. (unit employed: Werner-Pfleiderer screw extruder DKS 275, clamping force 275 mp, screw diameter 56 mm, length L/D:23/1).

| | Behaviour in fire as defined in UL Subject 94 | | | | | | | | | | |
|---|---|---|---|---|---|---|---|---|---|---|---|
| | Moulding composition | | | | | | | | | | |
| | 1 | 2 | 3 | 4 | 5 | 6 | 7 | 8 | 9 | 10 | 11 |
| 1.6 mm | V-2-/-/10 | V-0 | V-0 | V-2-/-/5 | V-0 | V-0 | V-2-1/-/9 | V-0 | V-0 | V-0 | V-0 |
| 2.5 mm | V-3-/-/2 | V-0 | V-0 | V-2-/-/5 | V-0 | V-0 | — | — | — | — | — |
| 3.2 mm | — | — | — | — | — | — | V-2-1/-/9 | V-0 | V-0 | V-0 | V-0 |
| Nature of injection-moulded article$^{(1)}$ | o.k. | o.k. | o.k. | o.k. | o.k. | o.k. | o.k. | n.i.o | o.k. | n.i.o | n.i.o |

$^{(1)}$Assessed visually on very large casings having a shot capacity of 245 g or on small sample panels 40 × 60 mm in size and 4 mm thick
o.k. = surface fault-free
n.i.o. = surface badly disturbed by microcracks.

| Mechanical properties Determined on small standard test bars; notched impact strength as specified in DIN 53,453, Vicat-B as specified in DIN 53,460 | | | | | | | | | | | |
|---|---|---|---|---|---|---|---|---|---|---|---|
| | Moulding composition | | | | | | | | | | |
| | 1 | 2 | 3 | 4 | 5 | 6 | 7 | 8 | 9 | 10 | 11 |
| Notched impact strength (kJ/m$^2$) | 21 | 23 | 22 | 34 | 36 | 34 | 34 | 33 | 30 | 34 | 33 |
| Vicat B temperature (°C.) | 136 | 135 | 136 | 137 | 138 | 139 | 138 | 137 | 136 | 136 | 137 |

As can be seen from the tablets, the non-flammability of the moulding compositions is considerably improved by the addition of the small amounts of tetrafluoroethylene polymer. If, however, the tetrafluoroethylene polymer is introduced in powder form when the components are compounded, although a good behaviour in fire is also achieved, the surfaces of moulded articles produced from such compositions are not always fault-free; they exhibit microcracks or striae. If tetrafluoroethylene polymer dispersions are processed to give the moulded articles (sic) by the process according to the invention, it is possible to injection-mould moulded articles without surface defects. In spite of the presence of the tetrafluoroethylene polymers in the moulding compositions, the important mechanical properties are not impaired.

Section C

Components used:

I. Polycarbonate formed from bisphenol A, phenol and phosgene, relative viscosity 1.285, measured in methylene dichloride at 25° C. in a 0.5% strength solution.

II. Polybutylene terephthalate having an intrinsic viscosity of 1.18 dl/g, measured in phenol/o-dichlorobenzene (ratio by weight 1: . . . (sic)) at 25° C. in an Ubbelohde viscometer.

III. Graft polymer, 80% of graft base composed of crosslinked polybutadiene (gel content over 70%, measured in toluene) and 20% of grafted-on material composed of methyl methacrylate.

IV. Mixture of 95% by weight of graft polymer according to III and 5% by weight of polytetrafluoroethylene having a fluorine content of 74% by weight.

V. Terpolymer formed from ethylene, acrylic acid and tert.-butyl acrylate in a ratio by weight of 89/4/7, having a melt index of 6-8 g/10 minutes (measured at 190° C. and 2.16 kp load as specified in DIN 53,735) and a density of 0.924 g/cm$^3$ (measured as specified in DIN 53,479).

VI. Pentaerythritol tetrastearate (conventional mode release agent).

Preparation of the mixture of graft polymer and tetrafluoroethylene polymer (component IV) (data in parts by weight)

100 parts of a 40% strength by weight aqueous dispersion of the graft polymer III and 3.5 parts of a tetrafluoroethylene polymer dispersion having a solids content of 60% by weight and a fluorine content (relative to the solid) of 73.7% by weight are mixed and stabilised with 1.8% by weight, relative to polymer solids, of phenolic antioxidants. The mixture is coagulated at 85°-95° C. by means of an aqueous solution of MgSO$_4$ (Epsom salt) and acetic acid at pH 4-5, and the coagulate is filtered off and washed until it is virtually free from electrolytes, then freed from the bulk of the water by centrifuging and then dried at 100° C. to give a powder.

Preparation and composition of the moulding compositions

The components (for parts by weight see Table 1 below) were melted and homogenised under an atmosphere of nitrogen on a twin-screw extruder. The cylinder temperature chosen was such as to ensure the composition temperature indicated in the table. The melt ribbon of the mixtures according to the invention was degassed before leaving the nozzle, cooled in water, granulated and dried. Processing was carried out on an injection moulding machine.

TABLE 1

| Example No. | Components, % by weight | | | | | | Composition temperature °C. | |
|---|---|---|---|---|---|---|---|---|
| | I | II | III | IV | V | VI | Extruder | Injection-moulding machine |
| 1. (comparison) | 52 | 36 | 10 | — | 2 | — | 277 | 270 |
| 2. (comparison) | 51.5 | 36 | 10 | — | 2 | 0.5 | 275 | 270 |
| 3. | 52 | 36 | — | 10 | 2 | — | 278 | 270 |

III. Properties of the moulded articles

The mould release behaviour of the moulding compositions is determined by injection-moulding a slightly conical cylinder. The larger external diameter of the cylinder was 43 mm; the smaller external diameter was 39 mm. The wall thickness was 3 mm and the height of the cylinder was 35 mm. These cylinders were injection-moulded continuously, the core temperature being increased slowly, starting from 60° C. The force which had to be applied by the demoulding pins to release the part from the mould was measured as a function of the temperature. Usually, this pressure is virtually constant up to a critical temperature of the mould core. Above a certain temperature, the mould release force suddenly increases considerably. This temperature is the adhesion temperature of the composition. It determines the cycle time very decisively. As well as this property, the Vicat B softening point as specified in DIN 54,450 and the Izod notched impact strength at $-20°$ C. as specified in ASTM D 256 using Izod bars 3.2 mm thick were determined additionally. Table 2 shows the results.

TABLE 2

| Example No. | Minimum mould release force, bar | Adhesion temperature °C. | Izod at $-20°$ C., J/m | Vicat B °C. |
|---|---|---|---|---|
| 1. comparison | 30 | 85-90 | 650 | 119 |
| 2. comparison | 30 | 85-90 | 630 | 117 |
| 3. | 35 | 95-100 | 531 | 125 |

It will be seen that the result of the addition according to the invention is to raise the adhesion temperature of the composition decisively. The Vicat B softening point is also raised. The impact strength at $-20°$ is, as before, in the tough region, that is to say the moulded articles do not undergo brittle fracture.

If the tetrafluoroethylene polymer is not introduced into the moulding composition of Example 3 by means of the process according to the invention, but is introduced as an additive, during the compounding stage, in the form of a tetrafluoroethylene polymer powder, the properties such as mould release are markedly poorer, the increase in Vicat is unsatisfactory, and a particularly objectionable disadvantage is that an unacceptable surface quality (disturbance in homogeneity) of injected moulded articles produced therefrom makes itself evident.

We claim:

1. A process for the production of a powder form polymer mixture which contains
   (A) a thermoplastic graft polymer of monomer selected from styrene, α-methylstyrene, p-methylstyrene, a halostyrene, acrylonitrile, methacrylonitrile, an alkyl acrylate, an alkyl methacrylate, maleic anhydride, an N-substituted maleinimide, vinyl acetate, vinyl chloride, vinylidene chloride or mixtures thereof on a rubber substrate having a rubber glass transition temperature below 0° C., the graft polymer having a rubber content of 8 to 80% by weight and (B) a highly disperse particulate tetrafluoroethylene polymer having a fluorine content of 65–76% by weight which comprises the steps:

(1) mixing a dispersion of graft polymer (A) having an average particle diameter ($d_{50}$) of 0.05 to 30 μm and a solids content of 20 to 60% by weight with a dispersion of a tetrafluoroethylene polymer (B) having an average particle diameter ($d_{50}$) of 0.05 to 30 um and a solids content of 30 to 70% by weight in such a way that no appreciable agglomeration of the particles in the disperson takes place to form a mixed dispersion containing 0.01 to 40% by weight of tetrafluoroethylene polymer and 99.99 to 60% by weight of organic substrate polymer, (II) coagulating the mixed dispersion from step (I) in a temperature range of 20° to 120° C. and at a pH value from 7 to 2 with the formation of a composition of powder particles whereby substantially all tetrafluoroethylene polymer powder particles formed during coagulation have a particle size of 30 μm or less, and (III) drying the coagulate formed in step (II) at a temperature of 50° to 150° C. to form a powder composition containing highly disperse tetrafluoroethylene polymer.

2. A process according to claim 1, in which dispersion (A) is an aqueous dispersion containing a substrate polymer having a particle diameter of 0.05 to 5 μm.

3. A process according to claim 2, in which the dispersion (A) contains 20 to 80% by weight of fine-grained thermoplastic polymer having an average particle size of 0.05 to 0.15 μm ($d_{50}$ value) and 20 to 80% by weight of a coarse-grained thermoplastic polymer having an average particle size of 0.2 to 0.8 μm.

4. A process according to claim 1, in which the dispersion (B) is an aqueous dispersion of the tetrafluoroethylene polymer.

5. A powder composition whenever prepared by the process of claim 1.

* * * * *